(12) United States Patent
Gehm et al.

(10) Patent No.: US 10,746,621 B2
(45) Date of Patent: Aug. 18, 2020

(54) PRESSURE SENSING SYSTEM WITH HEATER ASSEMBLY

(71) Applicant: BAE Systems Controls Inc., Endicott, NY (US)

(72) Inventors: William J. Gehm, Lisle, NY (US); Raymond J. Boyd, Bloomfield, NY (US); Glenn T. Diego, Newark Valley, NY (US); Robert J. Kunz, Endicott, NY (US); Clive A. Morris, Vestal, NY (US); Stephen L. Pero, Endwell, NY (US)

(73) Assignee: BAE Systems Controls Inc., Endicott, NY (US)

( * ) Notice: Subject to any disclaimer, the term of this patent is extended or adjusted under 35 U.S.C. 154(b) by 423 days.

(21) Appl. No.: 15/673,853

(22) Filed: Aug. 10, 2017

(65) Prior Publication Data
US 2019/0049327 A1 Feb. 14, 2019

(51) Int. Cl.
*G01L 19/00* (2006.01)

(52) U.S. Cl.
CPC .................... *G01L 19/00* (2013.01)

(58) Field of Classification Search
CPC . G01L 19/00; G01L 19/0015; G01L 19/0023; G01L 19/003; G01L 19/038; G01L 19/06; G01L 19/009204; G01L 19/0098; G01L 19/025; G01L 19/065; G01L 19/125; G01L 19/045; G01L 19/085; G01L 19/105; G01L 2019/0053; G01L 2019/0061; G01L 2019/0069; H05B 3/18; G01K 1/20; G01K 1/22; G01K 1/26; F01D 17/08; F01D 17/085; F05D 2270/301; F05D 2270/303; F05D 2270/313; F05D 2270/312
See application file for complete search history.

(56) References Cited

U.S. PATENT DOCUMENTS

| | | | | |
|---|---|---|---|---|
| 3,247,717 A | * | 4/1966 | Kemmer | G01L 9/04 73/726 |
| 8,413,494 B1 | * | 4/2013 | Lebron | F01D 17/08 73/112.01 |
| 2007/0199384 A1 | * | 8/2007 | Kuznar | F01D 17/06 73/700 |
| 2008/0047338 A1 | | 2/2008 | DuPuis | |
| 2016/0377487 A1 | * | 12/2016 | Cheung | G01K 1/08 374/141 |

OTHER PUBLICATIONS

International Search Report, PCT/US18/49441, dated Feb. 15, 2019, 11 pages.

* cited by examiner

*Primary Examiner* — Shawntina T Fuqua
(74) *Attorney, Agent, or Firm* — Scully Scott Murphy & Presser PC; Scott J. Asmus

(57) ABSTRACT

A pressure sensing system includes a pressure transducer, a pressure manifold, and a heater assembly. The pressure transducer is configured to measure pressures at one or more locations of a vehicle engine. The pressure manifold is configured to cover a face of the pressure transducer and provide an interface for transferring air or gas generated at the one or more locations of the vehicle engine. The heater assembly is configured to heat one or more portions of the pressure transducer and one or more portions of the pressure manifold and maintain a temperature of each of the pressure transducer and the pressure manifold above a predetermined temperature level.

18 Claims, 5 Drawing Sheets

PRESSURE SENSING SYSTEM WITH HEATER ASSEMBLY

FIELD

The present disclosure relates to a pressure sensing system for monitoring pressures of a vehicle engine, and more particularly to, a pressure sensing system having its temperature maintained above a freezing point to prevent failures or faults on the pressure sensing.

BACKGROUND

The evolution of aircraft engines has led to increasing demands on engine control systems (ECS) to improve safety or improve fuel consumption. The ECS (also known as a full authority digital engine control (FADEC)) includes one or more pressure sensing systems (PSS) for monitoring or controlling various pressures such as engine pressures at various stages of aircraft engines, an atmosphere pressure, etc. The PSSs are at risk of failures due to frozen water entrapped therein during the flight of an aircraft in an environment that the ambient temperature drops below the freezing point. To address the issues, drainage weep holes were formed in the pressure lines to remove accumulated water from a PSS, or a refrigerant-based vacuum pump was more recently employed to extract water while an aircraft is on the ground and the engine is not operating. However, this method is not effective since it can only be made between flights of an aircraft, and cannot prevent the freezing of PSSs during the flight. Thus, there is a need of a more effective solution for preventing a PSS from freezing even during the flight by maintaining its temperature above the freezing point.

SUMMARY

In an aspect of the present disclosure, a pressure sensing system is provided. The pressure sensing system includes a pressure transducer, a first pressure manifold, and a heater assembly. The pressure transducer is configured to measure pressures at one or more locations of a vehicle engine. The first pressure manifold is configured to cover a face of the pressure transducer and provide an interface for transferring air or gas generated at the one or more locations of the vehicle engine. The heater assembly is configured to heat one or more portions of the pressure transducer and the first pressure manifold and maintain a temperature of the pressure sensing system above a predetermined temperature level.

In another aspect of the present disclosure, a pressure sensing system includes a heated pressure subsystem, a non-heated subsystem, and a heater assembly. The heated pressure subsystem includes at least one pressure transducer and a first pressure manifold covering a face of the at least one pressure transducer. The heated pressure subsystem measures pressures at one or more locations of a vehicle engine. The heated pressure subsystem is assembled to the non-heated subsystem. The non-heated subsystem includes a second pressure manifold covering an outer surface of the pressure sensing system. The heater assembly is placed adjacent to the heated pressure subsystem, and configured to heat the heated pressure subsystem and maintain a temperature of the heated pressure subsystem above a predetermined level. Each of the first and second pressure manifolds provides an interconnecting path for transferring air or gas generated at the one or more locations of the vehicle engine.

The pressure sensing system may further include a thermal insulator disposed between the heated pressure subsystem and the non-heated subsystem.

In still another aspect, a pressure sensing system includes a pressure transducer and a heater assembly. The pressure transducer is configured to measure pressures at one or more locations of a vehicle engine. The heater assembly is configured to heat the pressure transducer and maintain a temperature of the pressure sensing system above a predetermined temperature level. The heater assembly includes a temperature sensor configured to sense an ambient temperature of the pressure sensing system, a plurality of heating elements configured to provide heat to the pressure transducer, and a control circuit configured to control turning on or off of the plurality of heating elements based on the sensed ambient temperature by the temperature sensor.

DETAILED DESCRIPTION OF THE EMBODIMENTS

Figure 1:
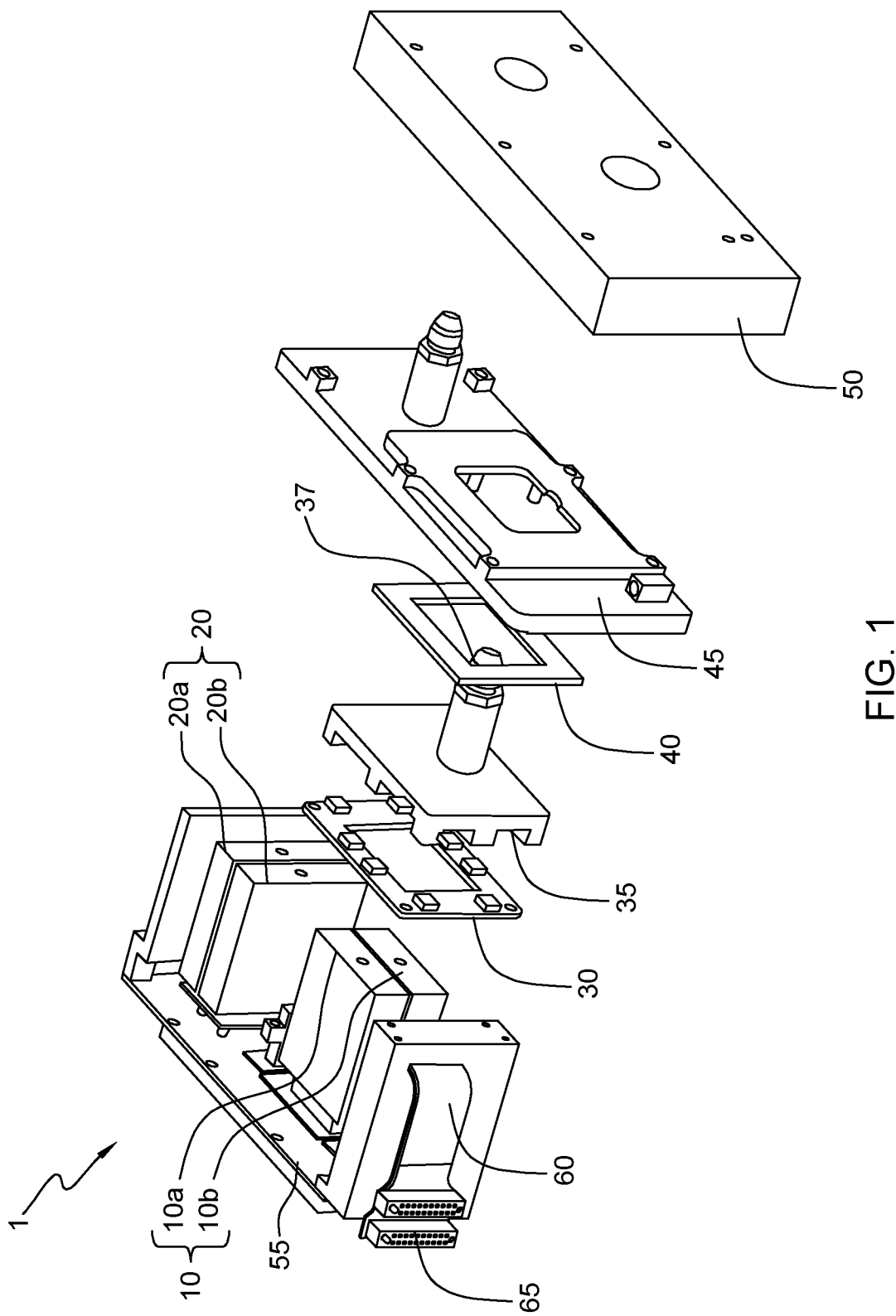
FIG. 1 depicts an example diagram of a PSS according to an embodiment of the present disclosure.

Embodiments of the present disclosure will now be described in detail on the basis of the drawings. However, the following embodiments do not restrict the invention claimed in the claims. Moreover, all combinations of features described in the embodiments are not necessarily mandatory for the architecture of the present system and methods. Like numbers are assigned to like elements throughout the description of the embodiments of the present disclosure.

It will be understood that, although the terms first, second, third, etc. may be used herein to describe various elements. However, locations of these elements or orders where the elements are arranged should not be limited by these terms. Instead, these terms are only used to distinguish one element from another element.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this standard, specify the presence of stated features, integers, steps, operations, elements, and/or components, but do not preclude the presence or addition of one or more other features, integers, steps, operations, elements, components, and/or groups thereof.

A PSS according to the present disclosure may be mounted into an ECS (e.g., FADEC) and configured to include an engine pressure sensing subsystem (EPSS) that measures engine pressures at various stages or locations of a vehicle engine. The PSS may also include an atmosphere pressure sensing subsystem (APSS) that measures an atmosphere pressure around the engine or the vehicle.

In the present disclosure, vehicles, for example, include, but are not limited to: aircraft such as airplanes, drones, blimps, rockets, space crafts, etc., and other aerospace vehicles, ground vehicles such as cars, buses, military vehicles, trains, etc.

For example, if the vehicle is an aircraft, the ECS may be a FADEC, the EPSS may be a high pressure sensing system, and the APSS may be a low pressure sensing system.

The PSS according to an embodiment of the present disclosure maintains the temperature of the PSS above the freezing point during flight with minimized impact on the control logic or power usage of the overall ECS.

To this end, in one embodiment, one or more heater assemblies are added in the PSS. The heater assemblies are placed adjacent to a heated pressure subsystem of the PSS. In the present disclosure, the heated pressure subsystem is a subsystem requiring heat in the PSS. For example, the heated pressure subsystem includes the EPSS and a corresponding local pressure manifold for measuring engine pressures. The heated pressure subsystem can be assembled to a larger pressure subsystem and a non-heated subsystem including, but not limited to, a main pressure manifold, a cover, a chassis, etc. The PSS can also be a system including the APSS and a corresponding local pressure manifold for measuring air pressure(s). Since pressure measurements are practically conducted by the heated pressure subsystem, the entrapping and freezing in or near the heated pressure subsystem may cause significant failures or malfunctions of the overall performance of the PSS. Thus, to increase the thermal efficiency in the PSS, the heater assemblies are located adjacent the heated pressure subsystem, so that the heat provided by the heater assemblies can be more concentrated on the heated pressure subsystem than the non-heated subsystem. The heated pressure subsystem and the non-heated subsystem are assembled to constitute the PSS.

In one embodiment, one or more thermal insulators are formed on various portions of the PSS to reduce the loss of heat traveling from the heated pressure subsystem to the non-heated subsystem. In one example, a thermal insulator is formed partially on a portion of the EPSS (or the APSS) or the local pressure manifold, and extends over a portion of the non-heated subsystem. In another example, a thermal insulator is formed between the local pressure manifold and the non-heated subsystem. In this particular example, the thermal insulator can be implemented using a thermal gasket.

In one embodiment, one or more thermal insulators are formed on various portions of the PSS to reduce the loss of heat traveling from the PSS to an ambient environment of the PSS. For example, a thermal insulator is formed on exterior surfaces of the heated pressure subsystem including a local pressure manifold and the non-heated subsystem including a main pressure manifold.

FIG. 1 depicts an example diagram of a PSS 1 according to an embodiment of the present disclosure.

As depicted in FIG. 1, the PSS 1 includes an EPSS 10 and/or an APSS 20. The EPSS 10 (e.g., PS3) includes one or more engine pressure transducers (EPTs) 10a and 10b measuring engine pressures at various stages or locations of a vehicle engine (not shown). The APSS 20 (e.g., P0) includes one or more atmosphere pressure transducers (APTs) 20a and 20b measuring atmosphere pressures around the vehicle or the vehicle engine. As depicted, the EPTs 10a and 10b are placed adjacent to each other, and the APTs 20a and 20b are placed adjacent to each other.

As depicted, the PSS 1 further includes a local pressure manifold 35 configured to provide an interconnecting path or interface for transferring air or gas existing between each EPT 10a and 10b and the engine. The EPSS 10 and the local pressure manifold 35 may be included in the heated pressure subsystem of the PSS 1 for measuring the engine pressure. The local pressure manifold 35 is configured to cover or enclose one face of the EPSS 10. In this particular example, the air or gas may be input sources upon which each EPT 10a and 10b can sense a pressure level at a target location for sensing of the engine.

The PSS 1 further includes a main pressure manifold 45 configured to cover or enclose one face of a chassis 55 constituting outer surface portions of the PSS 1. The main pressure manifold 45 serves as an interconnecting path for air or gas existing between a corresponding target location for sensing and the APSS 20. The main pressure manifold 45 also serves as a mechanical interface to secure the local pressure manifold 35 to the PSS 1. As depicted in FIG. 1, the EPSS 10 and the heater assembly 30 are attached to the local pressure manifold 35 as one assembly, and then attached to the main pressure manifold 45 having the gasket 40 therebetween. In addition, the APSS 20, the chassis 55, and the power flex 60 are attached to the main pressure manifold 45.

In one embodiment, to maintain the temperature of the heated pressure subsystem (including the EPSS 10 and the local pressure manifold 35) in the PSS 1 above the freezing point and prevent the freezing of the heated pressure subsystem in the PSS 1, a heater assembly 30 is placed adjacent to the EPSS 10 (or the local pressure manifold 35).

Locations or portions within the PSS 1 where freezing occurs may vary depending on: the internal structure of the PSS, such as the shape or size of the EPSS 10 (or the APSS 20); and aspects of how the EPSS 10 (or the APSS 20) are coupled to other elements such as the local pressure manifold 35. For example, freezing may occur at sensing lines connected to the EPSS 10 (or the APSS 20) or the corresponding local pressure manifold 35.

Thus, in one embodiment, the location and shape of the heater assembly 30 is determined to concentrate heat on required portions (e.g., the EPSS 10 and/or the local pressure manifold 35 of FIG. 1) of the PSS 1, so that the thermal efficiency for a given amount of electrical power can be maximized. In some aspects, the heater assembly 30 is embodied with a rectangular heater circuit card arranged in a ring around the base of the EPTs 10a and 10b. In another embodiment, another heater assembly (not shown) with substantially the same configuration as the heater assembly 30 is used to concentrate heat on other required portions (e.g., the APSS 20) of the PSS 1. The above-required portions may be understood as portions the heated pressure subsystem of the PSS 1.

Thus, in one embodiment, the heater assembly 30 is placed adjacent to at least one of the EPTs 10a and 10b and the local pressure manifold 35 to heat required portions thereof, so that the temperature of the PSS 1 (e.g., the EPTs 10a and 10b and the local pressure manifold 35) can be maintained above a predetermined temperature level (e.g., freezing temperature).

Although it is illustrated in FIG. 1 that only one heater assembly 30 is placed in the PSS 1, exemplary embodiments of the present disclosure are not limited thereto. In some aspects, two or more heater assemblies can be placed in close proximity to various portion of the heated pressure subsystem in the PSS 1.

The PSS 1 further includes a power flex 60 and a power connector 65 connected to a power supplying unit of an ECS to which the PSS 1 is mounted, so that the ECS can provide electrical power to the PSS 1. The power flex 60 is configured to provide appropriate levels of supply voltages to each of the EPTs 10a and 10b, the APTs 20a and 20b, and the card assembly 30.

Figure 2:
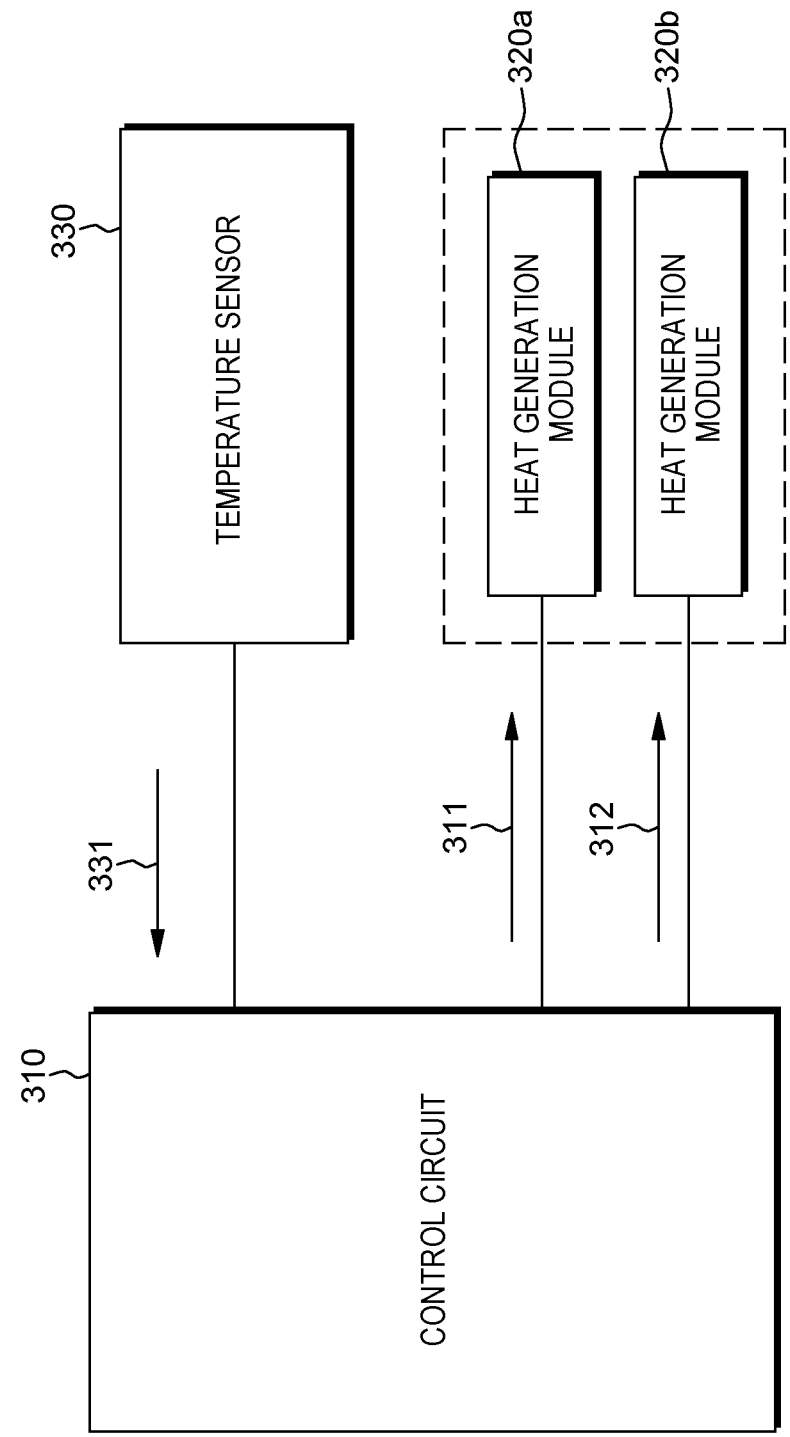
FIG. 2 depicts a block diagram of an example heater assembly according to an embodiment of the present disclosure.

FIG. 2 depicts a block diagram of an example heater assembly 30 according to an embodiment of the present disclosure.

Referring to FIG. 2, the heater assembly 30 includes a control circuit 310, one or more heat generation modules 320a and 320b, and a temperature sensor 330. The temperature sensor 330 is configured to sense an ambient temperature and generate a sense signal 331 based on the sensed ambient temperature. Although two heat generation modules 320a and 320b are illustrated in FIG. 2, exemplary embodiments of the present disclosure are not limited thereto and for example, there may exist one or more than two heat generation modules. The control circuit 310 is configured to receive the sense signal 331 from the temperature sensor 310 and generate control signals 311 and 312 based on the sense signal 331. The heat generation module 320a is turned on or off based on the control signal 311, and the heat generation module 320b is turned on or off based on the control signal 312. In one embodiment, each heat generation module 320a and 320b is embodied with one or more heating elements (e.g., metal heating elements such as power resistors, ceramic heating elements, polymer PTC heating element, etc) generating heats in response to current flowing therethrough.

Figure 3:
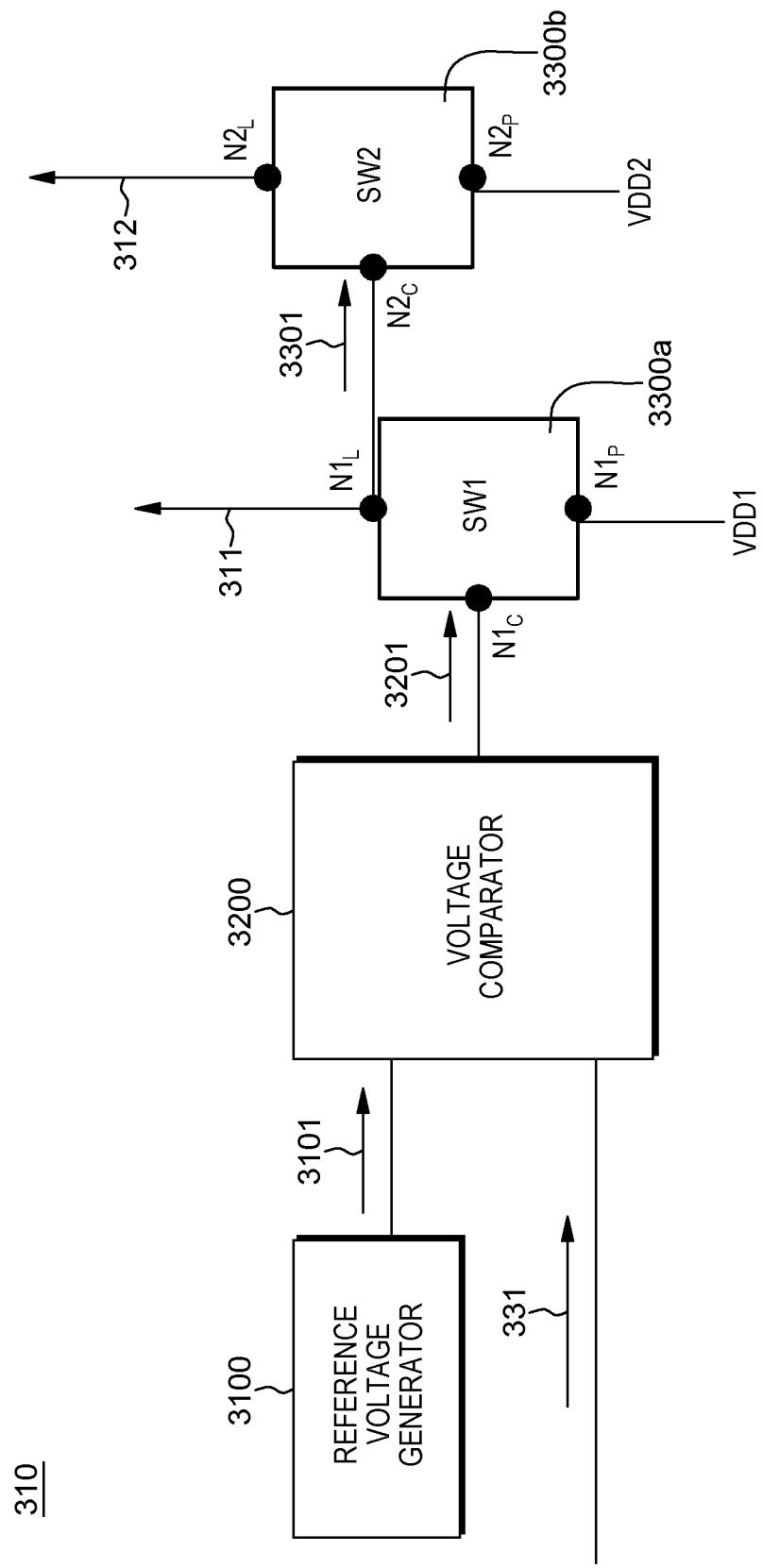
FIG. 3 depicts a block diagram of a control circuit of FIG. 2 according to an embodiment of the present disclosure.

FIG. 3 depicts a block diagram of the control circuit 310 of FIG. 2 according to an embodiment of the present disclosure.

Referring to FIG. 3, the control circuit 310 includes a reference voltage generator 3100, a voltage comparator 3200, and a plurality of switching elements 3300a and 3300b. The reference voltage generator 3100 is configured to provide a predetermined reference voltage signal 3101 to the voltage comparator 3200. The voltage comparator 3200 is configured to receive the reference voltage signal 3101 and the sense signal 331 provided by the temperature sensor 330 (FIG. 2) and perform a level comparison between the reference voltage signal 3101 and the sense signal 331 to generate an output signal 3201 corresponding to a difference therebetween.

Each switching element 3300a and 3300b has a control node, a power supply node to which an electrical supply voltage is supplied, and a load node connected to a corresponding heat generation module (e.g., 320a or 320b of FIG. 2). The switching element 3300a receives the output signal 3201 as a control input via a control node $N1_c$ and an electrical supply voltage VDD1 via a power supply node $N1_P$. In addition, the switching element 3300a is turned on to connect the power supply node $N1_P$ to a load node $N1_L$ according to the level of the output signal 3201 input to the control node $N1_c$. For example, the switching element 3300a is turned on to connect the nodes $N1_P$ and $N1_L$ when the level of the output signal 3201 exceeds a first reference level, generating the control signal 311 at the load node $N1_L$; otherwise is turned off. In addition, the switching element 3300b receives an output signal 3301 from the node $N1_L$ as a control input to a control node $N2_c$ and an electrical supply voltage VDD2 via a power supply node $N2_P$. Next, the switching element 3300b is turned on to connect the power supply node $N2_P$ to a load node $N2_P$ when the level of the signal 3301 exceeds a second reference level, generating the control signal 312 at the load node $N2_L$; otherwise is turned off. The load node $N1_L$ is coupled to the heat generation module 320a, and the load node $N1_L$ is coupled to the heat generation module 320b.

Figure 4:
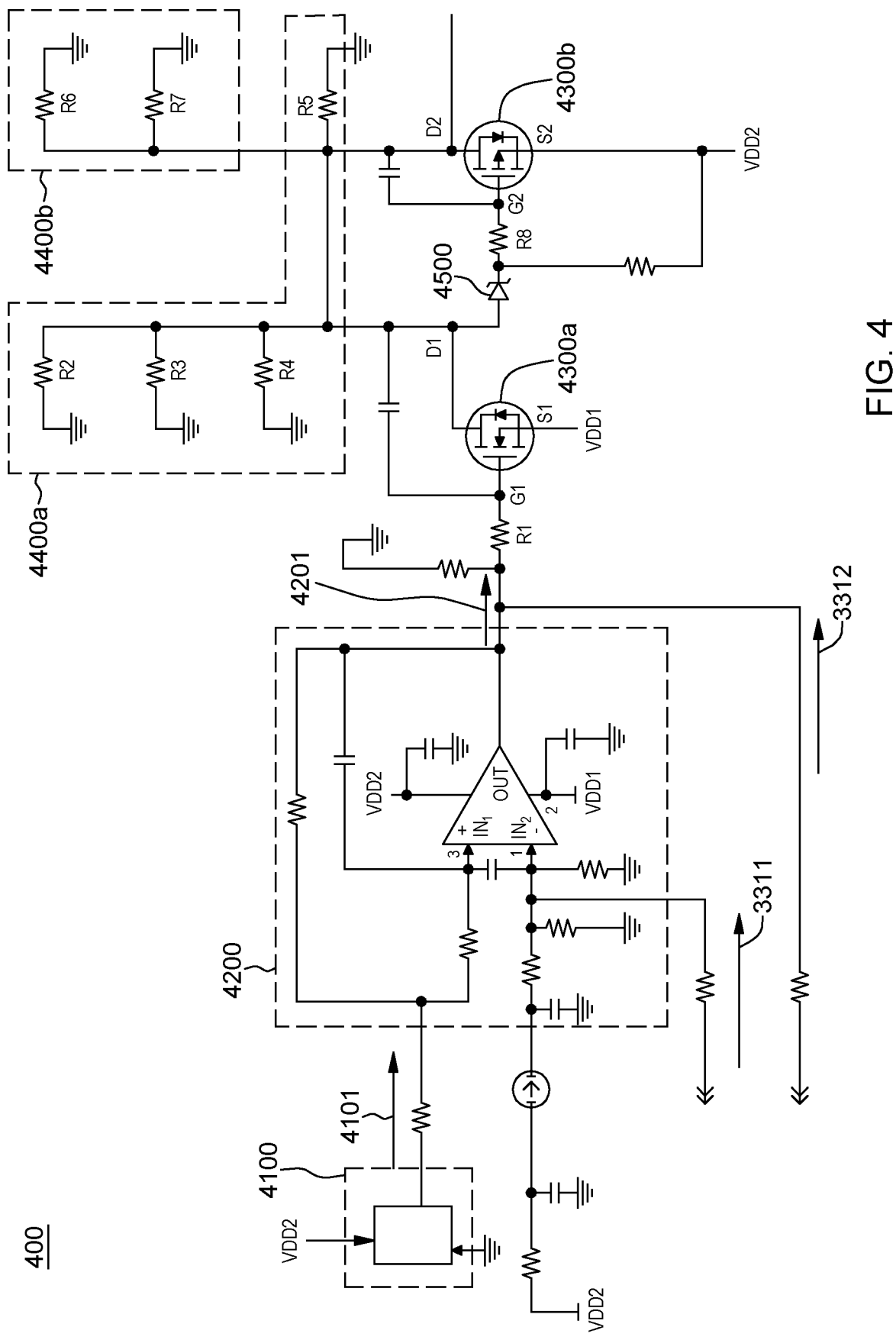
FIG. 4 depicts an example schematic circuit diagram for a control circuit and one or more heat generation modules of FIG. 2 according to an embodiment of the present disclosure.
Figure 5:
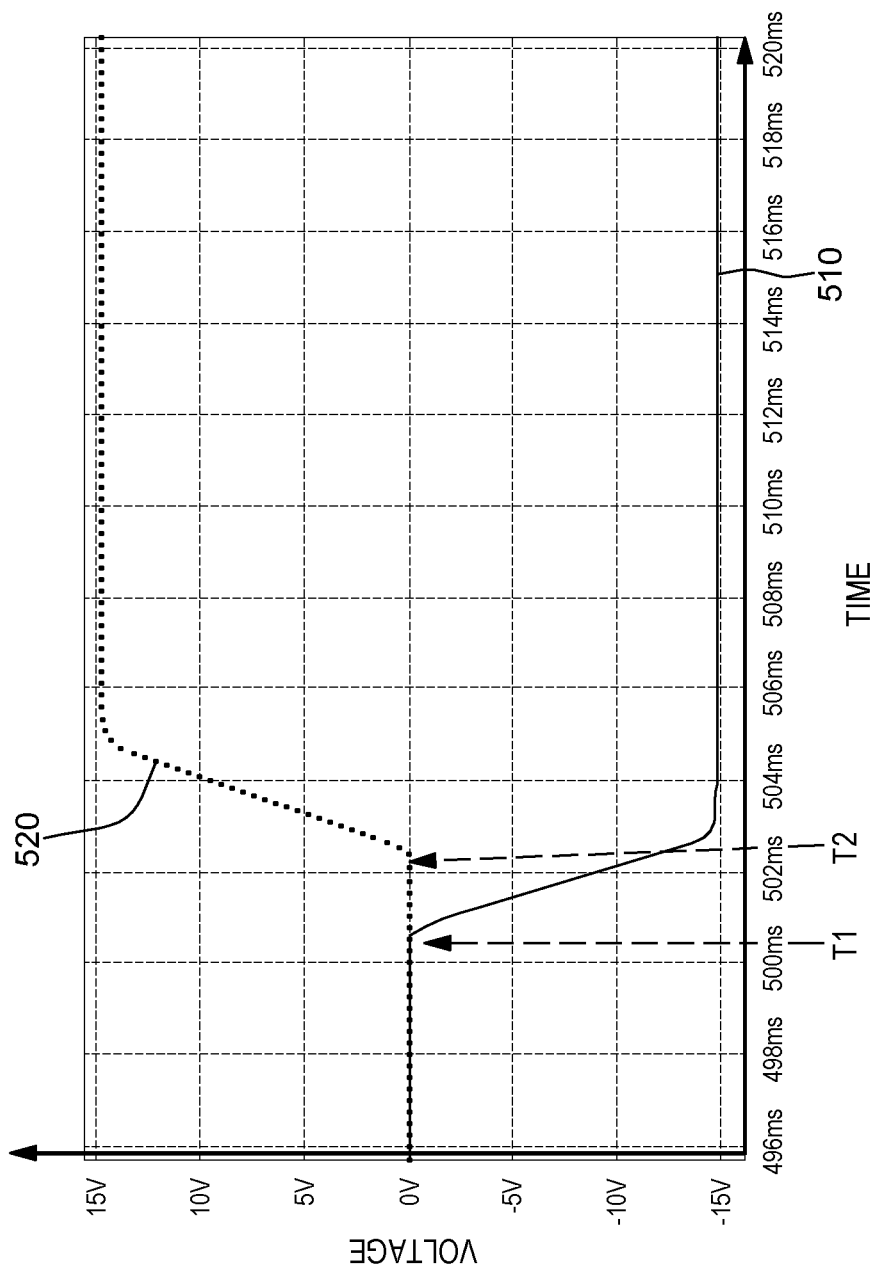
FIG. 5 is a diagram depicting example operations of first and second transistors of FIG. 4 according to an embodiment of the present disclosure.

FIG. 4 depicts an example schematic circuit diagram 400 for the control circuit 310 and the one or more heat generation modules 320a and 320b of FIG. 2 according to an embodiment of the present disclosure. FIG. 5 is a diagram depicting example operations of first and second transistors 4300a and 4300b of FIG. 4 according to an embodiment of the present disclosure.

As shown in FIG. 4, a voltage comparator 4200 is supplied with two power supply voltages VDD1 and VDD2. The voltage comparator has two input nodes $IN_1$ and $IN_2$. A reference voltage signal 4101 generated from a reference voltage generator 4100 is received via the input node $IN_1$ with no polarity inversion and a temperature sense signal 3311 generated from a temperature sensor (e.g., 330 of FIG. 2) is received via the input node $IN_2$ with the polarity inversion. The power supply voltage VDD2 is applied to the input node $IN_2$ via a series of RC circuit. The output signal of the voltage comparator 4200 is feedback to the input node $IN_1$.

The voltage comparator 4200 outputs a signal 4201 corresponding to a difference between the reference voltage signal 4101 and the sense signal 3311 to a gate node G1 of a first transistor 4300a via one or more resistors R1. An enable signal 3311 generated in response to the temperature sensor (e.g., 330) being activated may be added to the output node $O_1$ of the voltage comparator 4200. The power supply voltage VDD2 is provided to a source node S1 of the first transistor 4300a. In response to the output signal 4201 exceeding a reference level (e.g., $V_{GS}$; a voltage difference between the source node S1 and the gate node G1), the first transistor 4300a is turned on to connect the source node S1 to a drain node D1, thus allowing a heat generation module 4400a to generate heat based on a drain voltage at the drain node D1. The heat generation module 4400a includes one or more power resistors R2 to R5 connected in parallel. The drain node D1 of the first transistor 4300a is connected to a gate node G2 of a second transistor 4300b having a Zener diode 4500 and/or a resistor R8 therebetween, thus the drain voltage at the drain node D1 is applied to the gate node G2 when the first transistor 4300a is turned on. The power supply voltage VDD2 is connected to a source node S2 of the second transistor 4300b and a node between the Zener diode 4500 and the resistor R8.

In response to the voltage at the gate node G2 exceeding a reference level (e.g., $V_{GS}$; a voltage difference between the source node S2 and the gate node G2), the second transistor 4300b is turned on to connect the source node S2 to a drain node D2, thus allowing a heat generation module 4400b to generate heat based on a drain voltage at the drain node D2. The heat generation module 4400b includes one or more power resistors R6 and R7 connected in parallel.

Although it is illustrated in FIG. 4 that the heat generation module 4400a has a different number of resistors than the heat generation module 4400b, exemplary embodiments of the present disclosure are not limited thereto. For example, the heat generation modules 4400a and 4400b have the same number of resistors therein.

In one embodiment, the power supply voltages VDD1 and VDD2 of FIGS. 3 and 4 have different polarities from each other and substantially the same level (e.g., VDD1 is −15V and VDD2 is 15V). For example, when a polarity of the supply voltage VDD1 is negative, a polarity of the supply voltage VDD2 is positive. In this particular example, the drain voltage at the drain node D1 (when the first transistor 4300a is turned on) has a negative polarity, as shown with a curve 510 of FIG. 5. In a similar manner, and the drain voltage at the drain node D2 (when the second transistor 4300b is turned on) has a positive polarity, as shown with a curve 520 of FIG. 5.

As shown in FIG. 5, the first and second transistors 4300a and 4300b are turned on or off in a hysteresis fashion. For example, the first transistor 4300a is turned on at a time T1 to output the negative drain voltage (or current) at the drain node D1, and the second transistor 4300b is turned on at a time T2 later than T1 based on the drain voltage at the drain node D1 serving as a control voltage to the second transistor 4300b.

In one embodiment, each of the first transistor 4300a and the second transistor 4300b is embodied with a field-effect transistor (FET), in particularly, a metal-oxide-semiconductor FET (MOSFET). For example, the first transistor 4300a is embodied with a n-channel MOSFET, and the second transistor 4400b is embodied with a p-channel MOSFET.

Although it is illustrated in FIGS. 2 to 4 that a single control circuit controls the operations of dual heat generation modules, exemplary embodiments of the present disclosure are not limited thereto and for example, the number of heat generation modules controlled by a single control circuit is one or more than two.

Referring back to FIG. 1, in one embodiment, the PSS 1 includes a gasket 40 between the heated pressure subsystem (e.g., local pressure manifold 35) of the PSS 1 and the non-heated subsystem (e.g., main pressure manifold 45) of the PSS 1 to prevent the loss of heat from the heated pressure subsystem to the non-heated subsystem. For example, the gasket 40 serves as a thermal barrier (or thermal insulator) between the heated pressure subsystem and the non-heated subsystem to reduce the transferring of heat from the heated pressure subsystem to the non-heated subsystem and improve the overall thermal efficiency of the PSS 1.

Referring to FIG. 1, in one embodiment, to reduce the loss of heat, the gasket 40 is designed to be a rectangular ring around an I/O port 37 of the manifolds 35 and 45, so that a contact area between the heated regions and the non-heated regions can be reduced.

In one embodiment, to reduce the loss of heat, the contact area of the gasket 40 between the heated pressure subsystem and the non-heated subsystem of the PSS 1 is formed of materials with a relatively low thermal conductivity (e.g., 0.8 w/(m-K) compared to that (e.g., 237 w/(m-K) of the non-heated subsystem (e.g., main pressure manifold 45) of the PSS 1.

In another embodiment, some portions of the gasket 40 are formed of electrically conductive materials such as fluorosilicone elastomer filled with nickel plate graphite having a volume resistance of, e.g., 0.01 Ohm-cm for the environmental or electromagnetic interference (EMI) shielding on the EPSS 10.

In one embodiment, to reduce the loss of heat, one or more thermal insulators are placed in or on the PSS 1. In one example, as shown in FIG. 1, a thermal insulator 50 is formed on the exterior surfaces of the local pressure manifold 35 and the non-heated main pressure manifold 45 to prevent the loss of heat from the local pressure manifold 35 and the main pressure manifold 45 of the PSS 1 toward the ambient environment. The thermal insulator 50 of FIG. 1 covers both at least one portion of the heated subsystem and at least one portion of the non-heated subsystem of the PSS 1. For example, the thermal insulator 50 is disposed to cover the heated pressure subsystem and extend over one or more portions of the non-heated subsystem. The chassis 55 (e.g., frame support for the power flex 60) is assembled on the back side of the main pressure manifold 45.

In one embodiment, the thermal insulator 50 is formed of various materials such as polyetheretherketone (PEEK) material which is fluid-compatible and fire-resistant. Dimensions or shapes of the thermal insulator 50 may be designed to meet fitting interfaces with the corresponding I/O port 37 of the local pressure manifold 35 and the main pressure manifold 45.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A pressure sensing system, comprising:
   a pressure transducer configured to measure pressures at one or more locations of a vehicle engine;
   a first pressure manifold configured to cover a face of the pressure transducer and provide an interface for transferring air or gas generated at the one or more locations of the vehicle engine;
   a heater assembly configured to heat one or more portions of the pressure transducer and one or more portions of the first pressure manifold and maintain a temperature of each of the pressure transducer and the first pressure manifold above a corresponding predetermined temperature level; and
   a first thermal insulator disposed between the heated one or more portions and a non-heated portion of the pressure sensing system, wherein the non-heated portion is assembled to the heated one or more portions with the first thermal insulator disposed therebetween, wherein the heated one or more portions comprises the pressure transducer and the first pressure manifold, and wherein the first thermal insulator is electrically conductive.

2. The pressure sensing system of claim 1, further comprising:
   a second pressure manifold configured to cover an outer face of the pressure sensing system and provide an interface for transferring the air or the gas generated at the one or more locations of the vehicle engine, the non-heated portion including the second pressure manifold.

3. The pressure sensing system of claim 1, wherein the first thermal insulator has a lower thermal conductivity than the non-heated portion.

4. The pressure sensing system of claim 1, further comprising:
a second thermal insulator disposed to cover at least one of the heated one or more portions of the pressure sensing system.

5. The pressure sensing system of claim 4, wherein the second thermal insulator is formed of polyetheretherketone materials.

6. The pressure sensing system of claim 1, wherein the heater assembly comprises:
a temperature sensor configured to sense an ambient temperature of the pressure sensing system;
a plurality of heating elements configured to provide heat to the one or more portions of the pressure transducer and the one or more portions of the first pressure manifold; and
a control circuit configured to control turning on or off of the plurality of heating elements based on the sensed ambient temperature by the temperature sensor.

7. The pressure sensing system of claim 1, wherein the heater assembly is implemented with a rectangular heater circuit arranged in a ring around the pressure transducer.

8. A pressure sensing system, comprising:
a heated pressure subsystem including at least one pressure transducer and a first pressure manifold covering a face of the at least one pressure transducer, the heated pressure subsystem measuring pressures at one or more locations of a vehicle engine;
a non-heated subsystem to which the heated pressure subsystem is assembled, the non-heated subsystem including a second pressure manifold covering an outer surface of the pressure sensing system;
a heater assembly placed adjacent to the heated pressure subsystem, and configured to heat the heated pressure subsystem and maintain a temperature of the heated pressure subsystem above a predetermined level; and
a first thermal insulator disposed to separate at least one portion of the heated pressure subsystem and at least one portion of the non-heated subsystem,
wherein each of the first and second pressure manifolds provides an interconnecting path for transferring air or gas generated at the one or more locations of the vehicle engine, and
wherein the first thermal insulator is electrically conductive.

9. The pressure sensing system of claim 8, wherein the first thermal insulator is formed of polyetheretherketone materials.

10. The pressure sensing system of claim 8, further comprising:
a second thermal insulator disposed between the heated pressure subsystem and the non-heated subsystem.

11. The pressure sensing system of claim 10, wherein the second thermal insulator has a lower thermal conductivity than the non-heated subsystem.

12. The pressure sensing system of claim 8, wherein the heater assembly comprises:
a temperature sensor configured to sense an ambient temperature of the pressure sensing system;
a plurality of heating elements configured to provide heat to the one or more portions of the pressure transducer and one or more portions of the first pressure manifold; and
a control circuit configured to control turning on or off of the plurality of heating elements based on the sensed ambient temperature by the temperature sensor.

13. The pressure sensing system of claim 8, wherein the heater assembly is implemented with a rectangular heater circuit arranged in a ring around the at least one pressure transducer.

14. A pressure sensing system, comprising:
a pressure transducer configured to measure pressures at one or more locations of a vehicle engine;
a heater assembly configured to heat the pressure transducer and maintain a temperature of the pressure transducer above a predetermined temperature level,
wherein the heater assembly comprises:
a temperature sensor configured to sense an ambient temperature of the pressure sensing system;
a plurality of heating elements configured to provide heat to the pressure transducer; and
a control circuit configured to control turning on or off of the plurality of heating elements based on the sensed ambient temperature by the temperature sensor; and
a first thermal insulator disposed between the pressure transducer and a non-heated portion of the pressure sensing system to which the pressure transducer is assembled, wherein the first thermal insulator is electrically conductive.

15. The pressure sensing system of claim 14, wherein the control circuit comprises:
a voltage comparator configured to receive a reference voltage and a temperature voltage corresponding to the sensed ambient temperature and provide an output voltage corresponding to a difference between the reference voltage and the temperature voltage to a gate of a first transistor;
the first transistor configured to have a source coupled to a first power supply voltage and a drain coupled to a first group of the plurality of heating elements, the first transistor being configured to be turned on responsive to a voltage at the gate of the first transistor exceeding a first threshold level; and
a second transistor configured to a gate coupled to the drain of the first transistor through a Zener diode, a source coupled to a second power supply voltage, and a drain coupled to a second group of the plurality of heating elements, the second transistor being configured to be turned on responsive to a voltage at the gate of the second transistor exceeding a second threshold level.

16. The pressure sensing system of claim 15, wherein the first transistor is an n-channel field effect transistor (FET) and the second transistor is a p-channel FET.

17. The pressure sensing system of claim 15, wherein the first transistor and the second transistor are turned on at different times.

18. The pressure sensing system of claim 15, wherein a polarity of the first power supply voltage is opposite to a polarity of the second power supply voltage.

* * * * *